United States Patent [19]

Sirinyan et al.

[11] Patent Number: 5,342,890
[45] Date of Patent: Aug. 30, 1994

[54] COATING COMPOSITIONS WITH IMPROVED ADHESION TO PLASTICS

[75] Inventors: Kirkor Sirinyan, Bergisch Gladbach; Joachim Petzoldt, Düsseldorf, both of Fed. Rep. of Germany; Wolfgang Henning, Amagasaki, Japan

[73] Assignee: Bayer Aktiengesellschaft, Leverkusen, Fed. Rep. of Germany

[21] Appl. No.: 23,233

[22] Filed: Feb. 25, 1993

[30] Foreign Application Priority Data

Mar. 2, 1992 [DE] Fed. Rep. of Germany ....... 4206511

[51] Int. Cl.$^5$ .............................................. C08F 8/30
[52] U.S. Cl. .................................. 525/130; 525/127; 525/240; 525/455
[58] Field of Search ........................... 525/127, 130

[56] References Cited

U.S. PATENT DOCUMENTS

| | | | |
|---|---|---|---|
| 2,468,480 | 6/1946 | Bradley, Jr. | 260/3.5 |
| 3,399,071 | 8/1968 | Schaufelberger et al. | 117/12 |
| 3,676,391 | 7/1972 | DeRoss | 260/33.6 UA |
| 4,778,724 | 10/1988 | Bragole | 428/414 |
| 4,906,690 | 3/1990 | Hasenbein et al. | 525/88 |
| 5,043,375 | 8/1991 | Henning et al. | 524/372 |

FOREIGN PATENT DOCUMENTS

2011862 9/1990 Canada .
1040539 8/1966 United Kingdom .

*Primary Examiner*—James J. Seidleck
*Assistant Examiner*—Mary Critharis
*Attorney, Agent, or Firm*—Joseph C. Gil; Thomas W. Roy

[57] ABSTRACT

The present invention relates to a coating composition which is suitable for coating plastics and contains a one- or two-component binder and, as an adhesion promoter, a chemically modified crystalline, chlorine-free polyolefin, which has an average molecular weight of 1,000 to 8,000, a non-uniformity of 1.0 to 6.5 and a content of nitrogen, oxygen, sulphur and/or silicon in the form of chemically incorporated functional groups of 1.5 to 17.5 wt % in total. The present invention also relates to a process for coating plastics using this coating composition and to the resulting coated plastics.

12 Claims, No Drawings

COATING COMPOSITIONS WITH IMPROVED ADHESION TO PLASTICS

BACKGROUND OF THE INVENTION

1. Field of the Invention

The invention relates to new coating compositions containing a one- or two-component binder and an adhesion promoter, to a process for coating plastic substrates and to the resulting coated plastic substrates.

2. Description of the Prior Art

For the application of strongly adhering lacquer coatings to plastics, especially to PP (polypropylene) injection molded components, a chemical or physical modification of the substrate surfaces is necessary. Known modifications include flaming (for example F. Carbassi et al., J. Mater. Sci., 22, pages 207 to 212 (1987)), corona treatment (for example F. Lawson, Rubber Chem. and Technol., 60, 102 (1987)), plasma treatment (for example L. H. Coopes et al., J. Macromol. Chem. 17, pages 217 to 226 (1982) and EPA 0 282 094), and etching with chromosulphuric acid (for example M. Salkauskas, J. Appl. Polym. Sci., 26, pages 2079 to 2098 (1982)).

It is also disclosed that it is possible by the use of adhesion promoter coatings based on chlorinated polyolefins (U.S. Pat. No. 3,676,391) or maleic anhydride-modified polyolefins, especially amorphous polypropylene types (DE-OS 1,546,982) to improve the adhesion of coating to plastic components based on polypropylene and polyethylene.

These known methods are either costly or, in the case of injection molded components with complicated surfaces, inapplicable. In addition to the high treatment costs, the application of these adhesion promoter coatings may also result in environmental problems due to their low solids content. Moreover its application to particular lacquer systems is limited.

In PCT Application number WO 88/05346 it is proposed to modify the adhesion promoter coatings by means of additional measures such as UV irradiation, which leads to an additional expense.

The addition of chlorinated polyolefins, for example, the conventional chlorinated polypropylenes recommended in U.S. Pat. No. 2,468,480, to the coating compositions also has the disadvantage that such chlorinated polyolefins are not very compatible with the known plastics coating compositions. Furthermore, their solubility in the typical coating solvents is very small, which negatively affects the application of the coating compositions.

In DE-OS 1,546,982 it is recommended to use chemically modified amorphous polyolefins as a primer. However, it is not possible to directly add these polyolefins to coating compositions as adhesion promoters due to their incompatibility with the binders of these compositions.

In DE-OS 3,909,217 and 3,939,760 it is recommended to use coating compositions that contain at least one adhesion promoter based on chlorine-containing, chemically modified amorphous polyolefins with functional groups for the direct coating of plastic injection-molded components. For ecological reasons, however, chlorine-free systems are becoming increasingly important.

It is therefore an object of the present invention to provide a new coating composition for the direct, adherent coating of plastics which is suitable, due to the use of novel, chlorine-free adhesion promoters, for the production of high-grade coatings; which does not suffer from the disadvantages of the prior art coating compositions; and wherein the adhesion promoters can be incorporated into the coating compositions without sedimentation.

These objects may be achieved with the coating compositions of the present invention which contain certain chemically modified polyolefins as adhesion promoters and which are described in more detail hereinafter.

SUMMARY OF THE INVENTION

The present invention relates to a coating composition which is suitable for coating plastics and contains a one- or two-component binder and, as an adhesion promoter, a chemically modified crystalline, chlorine-free polyolefin, which has an average molecular weight of 1,000 to 8,000, a non-uniformity of 1.0 to 6.5 and a content of nitrogen, oxygen, sulphur and/or silicon in the form of chemically incorporated functional groups of 1.5 to 17.5 wt % in total.

The present invention also relates to a process for coating plastics using this coating composition and to the resulting coated plastics.

DETAILED DESCRIPTION OF THE INVENTION

The adhesion promoters according to the invention are preferably chemically modified, crystalline, stereo regular polyolefins having an average molecular weight determined by gel permeation chromatography of 1,000 to 8,000, preferably 3,000 to 6,000 and more preferably 4,000 to 5,000; a non-uniformity of 1.0 to 6.5, preferably 1.5 to 4.5; and a total content of nitrogen, oxygen, sulphur and/or silicon in the form of incorporated functional groups of 1.5 to 17.5 weight percent, preferably 2 to 10 weight percent.

The description "crystalline" means that the crystalline fraction of the polyolefin adhesion promoters is at least 50 weight percent. The preferred substrates to be coated according to the invention also are "crystalline" plastics, and in this regard the term "crystalline" is also means that the crystalline fraction of the plastics is at least 50 weight percent.

Suitable functional groups include carboxyl, carboxylic acid anhydride, carboxylic acid ester, carboxylic acid amide, carboxylic acid imide, aldehyde, ketone, sulphonic acid ester, hydroxyl, hydroperoxide, amino or alkoxysilane groups; and also heterocyclic groups such as imidazole, carbazole, or pyridinyl groups; activated double bonds such as vinylsulphonyl or vinylamido groups; and also mercapto groups. Preferred functional groups are hydroxyl, hydroperoxide (H—O—O—) carboxyl, carboxylic acid anhydride, carboxylic acid amide, carboxylic acid imide, carboxylic acid ester, amino and alkoxysilane (preferably trimethoxysilane groups) groups.

The particularly preferred functional groups include carboxylic acid anhydride, -imide, -ester and -amide groups, especially those that are formed by the reaction of incorporated carboxylic acid anhydride groups with mono-functional aliphatic alcohols and the optional subsequent reaction with epoxides or with monofunctional amines.

As starting materials for the production of the chemically modified adhesion promoters, stereo regular polypropylenes are preferably used. It is also possible, however, to use as "polyolefins" appropriate copolymers of propylene with other olefinically unsaturated monomers such as ethylene, isoprene or crystalline polyethylenes having the previously mentioned molecular weight and non-uniformity ranges. These comononers are used in the production the propylene-containing copolymers in amounts of 0 to 25 weight percent relative to the weight of all monomers.

The incorporation of the functional groups can be carried out by reaction with conventional peroxides (incorporation of hydroperoxide or carboxyl groups) or by radical initiated grafting reactions with monomers having functional groups according to the invention. Known peroxides or azo compounds can therefore be used as the initiator for the grafting reactions. The modification reactions are known and described for example in the following literature sources: G. A. Russel, J. Am. Chem. Soc., 79, 3871 (1957), M. Iring et al., Polymer Degradation 5 and Stability, 467 (1983), N. G. Gaylord, Journal of Polymer Science, Polymer Letters Edition, Vol. 21, 23–30 (1983), A. Neyishi et al., J. of Appl. Poly. Sci., 22, 2953 (1978) A. Hoff, J. of Appl. Poly. Sci., 29, 465 (1984).

Potassium peroxodisulphate, azobis-(isobutyronitrile), tert-butyl perbenzoate, tert-amyl perneodecanoate, p-benzodinen, tert-butyl perisononanoate, di-2-ethylhexyl peroxidicarbonate and di-n-butyl peroxydicarbonate are examples of suitable initiators.

Suitable monomers with functional groups include allylamine, allyl alcohol, trimethoxyvinylsilane, triethoxyvinylsilane, ethyl allyl ether, tetrahydrophthalic anhydride, maleic anhydride, dialkyl esters of maleic acid (such as dimethyl, diethyl, diisopropyl or di-n-butyl esters), maleic acid amides (such as maleic-acid-diethylamide), maleic acid imides (such as maleic-acid-N-(n-propyl)-imide or maleic-acid-N-(n-butyl)-imide, fumaric acid, the fumaric acid esters which correspond to the previously mentioned maleic acid esters, the fumaric acid amides which correspond to the previously mentioned maleic acid amides, 3-trimethoxysilyl-1-chloropropane, N-[2-(trimethoxysilyl)ethyl]ethylenediamine, 3-trimethoxysilyl-1-propyl-1-imidazole mercaptoalkyltrialkoxysilanes (such as mercaptoethyl-, mercaptopropyl- and mercaptobutyltrimethoxy- or -triethoxylsilane), vinyl carbonate, vinylsulphone and 3-trimethoxysilylpropyl-1-imidazole or -carbazole.

In general, suitable monomers are those which do not react with the polyolefins to form block copolymers. As is apparent from the list of suitable monomers with functional groups, it is not absolutely necessary that the monomers be olefinically unsaturated. It is sufficient for the suitability of the monomers that, under the conditions of the modification reaction described in more detail below, they are incorporated into the stereo regular olefins serving as grafting backbone. For example they can be incorporated through a condensation reaction (cleavage of hydrogen chloride).

Preferred adhesion promoters according to the invention are those based on stereo regular polypropylene that contain oxygen and optionally nitrogen in the form of the preferred functional groups previously set forth. For the production of these adhesion promoters, the modification reaction is preferably carried out with maleic anhydride, fumaric acid, the above-mentioned maleic acid imides or $C_1$–$C_4$ alkyl esters of acrylic acid or methacrylic acid as monomers.

The more preferred adhesion promoters are those that contain modified incorporated acid anhydride groups. These groups are obtained by initially incorporating acid anhydride groups, for example by using maleic anhydride, and which are then modified with monovalent aliphatic alcohols or amines. In the former case, after the ring-opening esterification by reaction of the anhydride groups with the alcoholic hydroxyl groups, the resulting carboxyl groups may optionally be reacted with epoxides, e.g., 1,2-epoxyhexane. Suitable alcohols or amines for this modification reaction include 1-butanol, 1-hexanol, higher MW fatty alcohols having up to 18 carbon atoms, 1-butylamine, 1-dodecylamine and 1-octadecylamine.

Functional groups can be incorporated both in the melt by means of extruders or other known injection molding techniques at temperatures of about 140° C. to 300° C., but preferably at temperatures above the melting range of the particular polyolefins used (cf. for this purpose G. M. Gale Applied Organometallic Chemistry 2, pages 17–31 (1988)) or in a suitable solvent (cf. for this purpose DE-OS 1,546,982). For incorporation of functional groups in solution, the grafting reaction is generally carried out at elevated temperatures of about 40° C. up to the boiling point of the solvent. Suitable solvents include xylene, carbon tetrachloride, toluene, chlorobenzene, tetralin, cresol and mixtures of these solvents.

The essential adhesion promoters of the present invention are present in the coating compositions in amounts of 2.5 to 55, preferably 20 to 45, weight percent, based on the weight of binder present in the coating composition.

The coating compositions according to the invention contain the one- or two-component binders which are known from coatings technology. Suitable binders include one- and two-component polyurethane systems, epoxy resins (see for example M. Lee, Handbook of Epoxy Resins, McGraw-Hill Book Company New York (1967)), alkyd resins, melamine resins, saturated or unsaturated polyester resins, acrylate systems crosslinkable by radiation, thermal treatment or radical initiators, two-component OH-functional acrylate-polyurethane systems, thermoplastic polyacrylates such as poly(methyl methacrylate), nitrocellulose, rubbers or polyamide resins. In principle, the use of binder mixtures that contain more than one binder is also possible.

The coating compositions to be used according to the invention are preferably solvent-containing coating compositions that contain known solvents such as butyl acetate, methyl ethyl ketone, methyl isobutyl ketone, methoxypropyl acetate, toluene, xylene and mixtures of these solvents. However, it is also possible to use low solvent, solvent-free or aqueous coating compositions containing the essential adhesion promoters in the previously mentioned amounts. Suitable coating compositions are described for example in H. Kittel, Lehrbuch der Lacke and Beschichtungen, volume IV, pages 76 to 306, Verlag W. A. Colomb (1986) or in the same textbook, 1976 edition, volume IV, pages 328 to 358.

The coating compositions are preferably the known one-component, more preferably two-component, polyurethane systems.

Suitable one-component polyurethane coating compositions include those that contain as binders the known NCO prepolymers which cure under the influence of atmospheric moisture. However, the use of these one-component polyurethane coating compositions is less preferred.

The preferred one-component polyurethane coating compositions are those based on predominantly linear, fully reacted polyurethanes which are soluble in the previously mentioned organic solvents and which dry physically, (see e.g. Kunststoff-Handbuch [Plastics Handbook], volume 7 "Polyurethanes", edited by Gunther Oertel, Carl-Hanser-Verlag MuncheyWien (1983), page 551). Suitable physically drying coating compositions include those whose binders are based on a fully reacted linear polyurethane obtained from (i) a polyester diol, (ii) a chain extending agent and (iii) a diisocyanate. Suitable polyester diols (i) include adipic acid-alkane diol polyester diols having a molecular weight of 600 to 3,000. The alkanediols include 1,4-butanediol, 1,6-hexanediol, neopentyl glycol and mixtures of these glycols. Suitable chain extending agents (ii) include the diols suitable for the production of the polyester diols as well as diamines such as hexamethylenediamine or isophoronediamine. Suitable diisocyanates (iii) include 2,4-diisocyanatotoluene, 1,6-diisocyanatohexane and 4,4'-diisocyanatodicyclohexylmethane. The polyurethanes are produced in known manner by maintaining an equivalent ratio of isocyanate groups to hydroxyl groups of about 0.9:1 to 1.1:1.

The more preferred polyurethane coating compositions according to the invention contain physically drying, predominantly linear polyurethanes as the essential binder component and in addition contain polyisocyanates as cross-linkers. Preferred polyisocyanate cross-linkers are the polyisocyanate derivatives described in more detail below. In these preferred polyurethane coating compositions the polyisocyanate cross-linkers are present in amounts of 2 to 30, preferably 7.5 to 15, and more preferably 8 to 12 weight percent, based on the total weight of all the binder components including the cross-linkers.

The most preferred coating compositions according to the invention are known two-component polyurethane coating compositions wherein the binder contains a polyol component and a polyisocyanate component in an NCO/OH equivalent ratio of 0.5:1 to 2:1, preferably 0.8:1 to 1.5:1.

Suitable polyisocyanates for these two-component coating compositions are the known polyisocyanate derivatives, preferably the (i) biuret-modified, (ii) isocyanurate- and optionally uretdione-modified and (iii) urethane- and/or allophanate-modified polyisocyanate derivatives which are prepared from monomeric diisocyanates such as 2,4-diisocyanatotoluene and, in particular, 1,6-diisocyanatohexane. These polyisocyanate derivatives generally have an NCO content of 10 to 25 weight percent and a monomeric diisocyanate content of less than 0.5 weight percent.

Suitable polyhydroxy compounds include polyester polyols, polyether polyols or polyacrylate polyols. The polyester polyols have a molecular weight of 500 to 5,000 and contain at least 2, preferably 2 to 6, hydroxyl groups per molecule. The polyether polyols have a molecular weight of 500 to 5,000 and contain 2 to 3 hydroxyl groups per molecule. The polyacrylate polyols have a molecular weight of 500 to 5,000 and contain 1 to 12 weight percent of hydroxyl groups.

Suitable binder components for the two-component polyurethane coating compositions are also described, e.g., on pages 541 to 544 of the previously mentioned Plastics Handbook.

The coating compositions may also further auxiliaries and additives such as catalysts, pigments, the previously mentioned solvents, levelling agents, fillers, etc. In the case of two-component polyurethane coating compositions, these auxiliaries and additives, in particular the adhesion promoters according to the invention, are generally added to the polyol component.

The coating compositions that contain the adhesion promoters according to the invention are very suitable for coating thermoplastic or thermosetting plastics. They are particularly suitable for coating polyolefins with a surface tension of <36 mN/m, which often cannot be directly coated with an adherent coating. Such polyolefins include optionally modified crystalline polypropylenes and polyethylenes. Particularly preferred substrates for the coating compositions according to the invention are moldings of polypropylene or plastic blends of polypropylene and diene copolymers, preferably ethylene-propylene-norbornadiene copolymers ("EPDM-modified polypropylene"). Corresponding plastic blends based on polyethylenes are also highly suitable. Additional substrates include polyvinylidene fluoride, acrylonitrilebutadiene-styrene copolymers, polycarbonates, polyamide plastics, polyesters, polybutadiene, polysilicones and cellulose esters. The coating compositions containing the additives essential to the invention are generally applied in quantities sufficient to provide a dry film thickness of 0.5 to 100, preferably 20 to 50 $\mu$m. Any of the known coating processes may be used for applying the coating compositions. The resulting coatings are distinguished by their outstanding solvent resistance.

In the case of multiple coatings, the primer naturally contains the additive essential for the invention, while the use of the same or analogous additives in the remaining coats is optional. Improved intercoat adhesion may be obtained by adding the adhesion promoters in the amounts previously set forth to the coating compositions which do not into direct contact with the plastic to be coated.

The coated plastics according to the invention can be used in many diverse fields, e.g., the internal and external areas of automobiles, electrical and electronic instruments and various household appliances.

The invention is further illustrated but is not intended to be limited by the following examples in which all parts and percentages are by weight unless otherwise specified.

EXAMPLES

Example 1

100 g of fully crystalline polypropylene having an average molecular weight ($M_w$) of 6,500 and containing 5 weight percent of incorporated maleic anhydride (MA) groups were dissolved at 140° C. in 675 g of xylene and filtered hot. 3.7 g of n-butanol were then added dropwise to the solution at 140° C. under nitrogen and stirred for 4 h at 140° C. under nitrogen. Afterwards, 5 g of 1,2-epoxyhexane were added to the solution, which was stirred for a further 30 minutes at 140° C. under nitrogen. The additive thus prepared contained 3.7 weight percent of oxygen in the form of functional groups (predominantly carboxylic acid ester groups).

To prepare a one-component polyurethane coating composition, 560 g of a 40 weight percent solution of a fully reacted linear polyurethane (Desmolack 4340, manufacturer: Bayer AG, D-5090 Leverkusen) in n-butanol/toluene (1:1) were added dropwise over a period of 1 hour to the previously described additive solution and the mixture was cooled with stirring to 20° C.

A commercial panel, 100 mm×100 mm in size, of EPDM-modified polypropylene (Hostalert PPN 8018, available from Hoechst AG company, D-6230 Frankfurt/Main) was discharged by blowing with ionized air, freed from dust particles and then coated by spraying with the previously described coating composition which also contained 30 g of a commercial biuret polyisocyanate prepared from hexamethylene diisocyanate (Desmodur N 100, manufacturer: Bayer AG). The coating was dried at 80° C. for 30 minutes in a drying cabinet. The dry film thickness was about 25 μm.

The resulting coating had an adhesion to the substrate according to DIN 53 151 of Gt 0 (very good).

Comparison Example 1

Example 1 was repeated without the adhesion promoter according to the invention. The resulting coating had an adhesion according to DIN 53 151 of Gt 5 (very poor). The coating was removed without difficulty from the plastic substrate.

Example 2

100 g of crystalline polypropylene which had an average molecular weight ($M_w$) of 7,500 and a degree of crystallinity of 83 weight percent and which contained 4 weight percent of incorporated maleic acid anhydride groups were dissolved at 140° C. in 675 g of xylene and filtered hot.

Subsequently 13.76 g of n-octadecylamine were added to the solution, which was then stirred for 4 h at 140° C. under nitrogen. The resulting additive solution according to the invention contained 1.4 weight percent oxygen and 0.6 weight percent nitrogen in the form of functional groups.

560 g of the linear polyurethane solution described in Example 1 were added dropwise over a period of 1 hour under nitrogen to the above-described additive solution and the mixture was cooled to 20° C. with stirring.

The resulting coating composition was stable to sedimentation and suitable for adherently coating plastic injection molded components.

A panel, 100 mm×100 mm in size, of a commercial diene-modified polypropylene (Keltan 0550, available from DSM AG company, NL-6411 Heerlen) was discharged by blowing with ionized air, freed from dust particles and then coated by spraying with the modified one-component polyurethane coating composition. (Dry film thickness about 30 μm).

After application of the coating composition, it was flashed off for 10 minutes and dried at 70° C. The resulting coating had an adhesion to the substrate according to DIN 53 151 of Gt 0.

Example 3

A commercial panel of modified polypropylene, 100 mm×100 mm in size, according to Example 2, was discharged by blowing with ionized air, freed from dust particles and then coated by spraying with a two-component polyurethane coating composition modified according to the invention.

Component I of the coating composition contains a mixture of

| | |
|---|---|
| 95 parts | of a polyacrylic resin having a hydroxyl group content of 2.5 weight percent (Desmophen A 365 of Bayer AG, D-5090 Leverkusen), |
| 25 parts | of the solution in xylene of the adhesion promotor according to Example 1, |
| 49.3 parts | talc |
| 3.2 parts | black pigment (carbon black), |
| 65.6 parts | titanium dioxide pigment (rutile), |
| 4.8 parts | of a 10% solution in xylene of a commercial antisettling agent (Bentone 38, available Kronos Titan GmbH company, D-5090 Leverkusen) and |
| 155 parts | of a solvent mixture of butyl acetate and xylene in a weight ratio of 1:1. |

Component II of the coating agent is a 75% solution in 1-methoxypropyl acetate/xylene (1:1) of a biuret polyisocyanate prepared from 1,6-diisocyanatohexane and having an NCO content, based on the solution of 16.5 weight percent (Desmodur N 75 of Bayer AG ).

The amounts of components I and II corresponded to an NCO/OH equivalent ratio of 1:1.

After the lacquer had been applied, it was flashed off for 10 minutes and dried at 70° C. The dry film thickness was about 25 μm.

The resulting coating had an adhesion to the substrate according to DIN 53 151 of Gt 0.

Comparison Example 2

Example 3 was repeated without the adhesion promoter according to the invention. The resulting coating had an adhesion according to DIN 53 151 of Gt 5. The coating was removed without difficulty from the plastic substrate.

Example 4

100 g of crystalline polypropylene which had an average molecular weight of 4,300 and a degree of crystallinity of 90 weight percent and which contained 5 weight percent of incorporated MA groups (corresponding to 2.4 weight percent oxygen in the form of incorporated functional groups) were dissolved at 140° C. in 675 g of xylene and filtered hot.

The solution obtained was added dropwise under nitrogen over a period of 1 hour to 565 g of the solution of the linear polyurethane described in Example 1 and the resulting mixture was stirred for 5 hours at 140° C. under nitrogen. Subsequently, the mixture was cooled with further stirring to room temperature. To this mixture were added 40 g of a commercial polyisocyanate prepared from hexamethylene diisocyanate (Desmodur N 3200, manufacturer: Bayer AG).

A polypropylene panel according to Example 2 was coated by spraying with the above-described polyurethane coating composition. After the coating was applied, it was flashed off for 10 minutes and dried at 80° C. The coating had a dry film thickness ca. 25 μm and was free of wetting defects.

The resulting coating had an adhesion to the substrate according to DIN 53 151 of Gt 0.

Example 5

A polypropylene panel (Keltan TP 0550, available from the DSM company) which had not been pretreated was coated at room temperature with a coating composition containing

| | |
|---|---|
| 53.9 parts | of a solution of the linear polyurethane containing the adhesion promoter according to the invention described in Example 1 |
| 10.1 parts | of titanium dioxide pigment (Bayertitan R-KB-2, available from Bayer AG |

| | |
|---|---|
| 1.8 parts | of the polyisocyanate solution described in Example 3 |
| 3.6 parts | of Talc IT extra, available from A/S Norwegian Talc, D-6232 Bad Soden |
| 3.6 parts | of a filler based on heavy spar (Millicarb, available from the Omya Company, 5000 Koln) |
| 3.0 parts | of a 20% carbon black formulation (Efwekoschwarz, available from Degussa AG, 6000 Frankfurt/Main) |
| 2.1 parts | of an antisettling agent which provides a thixotropic effect (Bentone 38, available from Kronos Titan GmbH) |
| 21.9 parts | of a solvent mixture of xylene/butyl acetate/n-butanol in a 3:2:1 weight ratio |

The applied coating was subsequently dried over a period of 30 minutes at 80° C.

The resulting coating had an adhesion to the panel according to DIN 53 151 of Gt 0. This primer was coated without difficulty with a commercial two-component polyurethane coating composition and was free from wetting defects. Its dry film thickness was about 20 μm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which is suitable for coating plastics and comprises a one- or two-component polyurethane binder and, as an adhesion promoter, a chemically modified crystalline, chlorine-free polyolefin, which has an average molecular weight of 1,000 to 8,000, a non-uniformity of 1.0 to 6.5 and a content of nitrogen, oxygen, sulphur and/or silicon in the form of chemically incorporated functional groups of 1.5 to 17.5 wt % in total, and is selected from the group consisting of polypropylene and copolymers of propylene with up to 25 wt % of other olefinically unsaturated monomers, based on the weight of the monomers used to prepare the copolymers.

2. The coating composition of claim 1 wherein the adhesion promoter contains oxygen and optionally nitrogen in the form of incorporated carboxylic acid anhydride, imide, ester or amide groups.

3. The coating composition of claim 1 wherein the adhesion promoter contains oxygen and optionally nitrogen in the form of incorporated carboxylic acid anhydride groups modified with i) monofunctional aliphatic alcohols and optionally epoxides or ii) monofunctional amines.

4. The coating composition of claim 1 wherein the binder comprises a prepolymer having free isocyanate groups which is curable under the influence of moisture.

5. The coating composition of claim 2 wherein the binder comprises a prepolymer having free isocyanate groups which is curable under the influence of moisture.

6. The coating composition of claim 3 wherein the binder comprises a prepolymer having free isocyanate groups which is curable under the influence of moisture.

7. The coating composition of claim 1 which comprises a two-component polyurethane binder.

8. The coating composition of claim 2 which comprises a two-component polyurethane binder.

9. The coating composition of claim 3 which comprises a two-component polyurethane binder.

10. The coating composition of claim 1 wherein the binder comprises a solution of a physically drying, film-forming polyurethane in combination with an organic polyisocyanate as cross-linking agent.

11. The coating composition of claim 2 wherein the binder comprises a solution of a physically drying, film-forming polyurethane in combination with an organic polyisocyanate as cross-linking agent.

12. The coating composition of claim 3 wherein the binder comprises a solution of a physically drying, film-forming polyurethane in combination with an organic polyisocyanate as cross-linking agent.

* * * * *